(12) United States Patent
Porter

(10) Patent No.: US 6,660,216 B1
(45) Date of Patent: Dec. 9, 2003

(54) METHODS AND APPARATUS FOR BLOW MOLDING USING MICROGRAINED PATTERNS

(75) Inventor: Marshall R Porter, Oakdale, IL (US)

(73) Assignee: Conix Corporation, Aurora (CA)

(*) Notice: Subject to any disclaimer, the term of this patent is extended or adjusted under 35 U.S.C. 154(b) by 0 days.

(21) Appl. No.: 09/857,886

(22) PCT Filed: Dec. 14, 1999

(86) PCT No.: PCT/US99/29599
§ 371 (c)(1),
(2), (4) Date: Jun. 12, 2001

(87) PCT Pub. No.: WO00/35647
PCT Pub. Date: Jun. 22, 2000

Related U.S. Application Data
(60) Provisional application No. 60/112,212, filed on Dec. 14, 1998.

(51) Int. Cl.[7] ............................................. B29C 49/62
(52) U.S. Cl. ........................ 264/523; 249/141; 425/522; 425/812
(58) Field of Search ........................ 264/523; 249/141; 425/522, 812

(56) References Cited

U.S. PATENT DOCUMENTS

| | | |
|---|---|---|
| 3,151,360 A | 10/1964 | Jurgeleit |
| 3,474,498 A | 10/1969 | Hoppes |
| 4,872,827 A | 10/1989 | Noda |
| 5,271,882 A | 12/1993 | Shirahata et al. |

FOREIGN PATENT DOCUMENTS

| | | |
|---|---|---|
| DE | 2939314 A1 | 4/1981 |
| JP | 5185498 | 7/1993 |

OTHER PUBLICATIONS

Modern Plastics, Blow Mold Venting Methods, Aug. 1970, p. 23.

Primary Examiner—Robert Davis
(74) Attorney, Agent, or Firm—Banner & Witcoff, Ltd

(57) ABSTRACT

Processes and apparatus for blow molding include a mold surfaces having micrograined patterns to improve venting and surface finish. The micrograined patterns are preferably in the form of projections that define between them a network of interconnected channels. The projections are of a sufficient height that they engage the outer surface of a fully-expanded parison and form venting passages with the parison surface to permit trapped air to escape and migrate through vent holes which communicate with the channels. The dimensions and shape of the projections are selected to provide for the formation of venting passages while preventing the formation of patterns in the surface of the molded product.

12 Claims, 2 Drawing Sheets

METHODS AND APPARATUS FOR BLOW MOLDING USING MICROGRAINED PATTERNS

This application is a 371 of PCT/US99/29599, filed on Dec. 14, 1999, which claims the benefit of U.S. Provisional Application No. 60/112,212, filed Dec. 14, 1998.

BACKGROUND OF THE INVENTION

The present invention relates to molding processes and apparatus and to blow molded articles. Specifically, the present invention relates to blow molding processes and apparatus which improve the venting of trapped air from molded material and which improve the surface finish on molded articles, such as automobile fascias, bumpers or other body components.

Fundamentally, blow molding is a manufacturing technique that involves the use of compressed gas to expand material, usually a thermoplastic, outward against the inner walls of a surrounding, split-cavity mold. In extrusion blow molding methods and apparatus, molding is accomplished by first extruding a preselected length of material, for example, heat-softened thermoplastic, into a tubular preform, also called a parison. The parison is then surrounded, and usually pinched at one or more locations, by the split-cavity mold. A blow pin is then inserted into the parison and compressed gas is injected through the blow pin to inflate the parison, much like a balloon, against the sides of the mold. Typically, low gas pressures are used. Contact of the thermoplastic material with the mold causes the material to cool and harden in the desired shape. The split-cavity mold is then separated and the molded article is removed.

In the manufacture of blow molded articles such as automobile body components, it is often desirable to provide a very smooth, aesthetically pleasing surface finish. However, it is difficult to obtain smooth, high quality surface finishes on products molded using conventional blow molding techniques without further surface finishing, such as sanding and painting. This difficulty arises, in part, from the presence of air or other gas at or near the surface of the molded article. Trapped air or gas may cause variations or defects in the surface finish of the molded product. Blow molding is especially susceptible to the undesireable effects of trapped air because of the use of compressed gases in the molding process and because of the displacement of air from the mold due to the expansion of the parison.

Conventional blow molding techniques have addressed this problem by providing vent holes at spaced intervals on the mold surface to facilitate venting of trapped air. However, vent holes provide for venting of trapped air only in local regions on the surface of the molded product; some trapped air may not reach vent holes during the molding process. To provide more uniform venting, it is known to utilize porous metal molds. However, porous molds are prone to clogging after repeated use and require additional effort to maintain. Thus, there remains a need for blow molding processes and apparatus which provide uniform and sufficient venting of trapped air and high quality surface finishes, yet which do not require significant maintenance effort.

SUMMARY OF THE INVENTION

The aforementioned problems are eliminated and desired advantages are realized by the present invention, which contemplates new and improved processes and apparatus for blow molding by providing mold surfaces with micrograined patterns to improve venting and surface finish. The micrograined patterns are preferably in the form of a pattern of projections which define between them a network of interconnected channels. The projections are of a sufficient height that they engage the outer surface of the fully-expanded parison. The channels are of a sufficient depth that, when the parison engages the projections, the channels form venting passages with the parison surface to permit trapped air to escape and migrate through vent holes which communicate with the channels. The dimensions of the projections are selected to provide for the formation of venting passages while preventing the formation of patterns in the surface of the molded product.

In one aspect, the invention may be defined as an apparatus for molding articles, the apparatus comprising a mold having a mold surface provided with a micrograined pattern which facilitates the formation of venting passages with the surface of an expanded parison. More particularly, the invention may be defined as an apparatus for blow molding articles in which the mold surface is provided with a micrograined pattern that includes projections of a substantially circular or parallelogram shape, the projections defining a network of interconnected channels which form venting passages with the surface of the expanded parison.

In another aspect, the invention may be defined as a process for blow molding articles, the process comprising the steps of: a) providing a parison of material to be expanded outward into a mold; b) providing a mold having a mold surface including a micrograined pattern; c) providing a parison of material within the mold; d) expanding the parison outward against the mold surface such that an outer surface of the parison forms venting passages with the micrograined pattern. More particularly, the invention may be defined as a process for blow molding articles, the process comprising the steps of: a) providing a parison of material to be expanded outward into a mold; b) providing a mold having a mold surface including a micrograined pattern, the pattern including projections of a substantially circular or parallelogram shape defining a network of interconnected channels; c) providing a parison of material within the mold; d) expanding the parison outward against the mold surface such that an outer surface of the parison engages the projections and forms venting passages with the channels.

In yet another aspect, the invention may be defined as a blow-molded article, formed by a process comprising the steps of: a) providing a parison of material to be expanded outward into a mold; b) providing a mold having a mold surface including a micrograined pattern; c) providing a parison of material within the mold; d) expanding the parison outward against the mold surface such that an outer surface of the parison forms venting passages with the micrograined pattern. More particularly, the invention may be defined as a blow-molded article, formed by a process comprising the steps of: a) providing a parison of material to be expanded outward into a mold; b) providing a mold having a mold surface including a micrograined pattern, the pattern including projections of a substantially circular or parallelogram shape defining a network of interconnected channels; c) providing a parison of material within the mold; d) expanding the parison outward against the mold surface such that an outer surface of the parison engages the projections and forms venting passages with the channels.

BRIEF DESCRIPTION OF THE DRAWINGS

The accompanying drawings which are incorporated into and form a part of the specification, illustrate embodiments of the present invention and, together with the description, serve to explain the principles of the invention. The drawings are only for the purpose of illustrating preferred embodiments of the invention and are not to be construed as limiting. In the drawings, in which like numbers refer to like parts throughout.

DESCRIPTION OF THE PREFERRED EMBODIMENTS

Figure 1A:
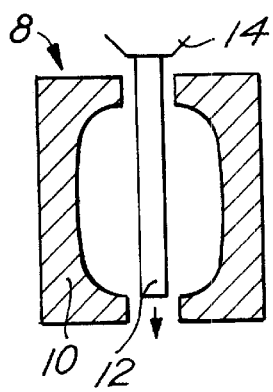
FIGS. 1A–1D are illustrations of a blow molding process and apparatus according to a preferred a embodiment of the present invention.

Referring to FIG. 1A, an extrusion blow molding apparatus 8, according to the present invention, includes a split-cavity mold 10 comprised of two movable half portions. With the half portions separated, a tubular parison 12 of a preselected length of extruded material, typically a thermoplastic such as polyethylene or polypropylene, exits from an extrusion die 14 into the space between the half portions.

Figure 1B:
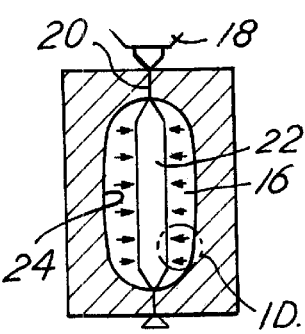
Figure 1C:
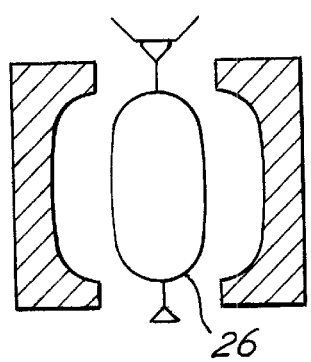

Referring to FIG. 1B, after the parison 12 is extruded to the appropriate length, the half portions of the mold 10 are brought together to define a mold cavity 16. The parison 12 is pinched at top and bottom ends between the half portions. A gas injection device 18, including a blow pin 20 that extends through a hole (not shown) in mold 10, introduces compressed gas into the parison cavity 22, thereby expanding the parison 12 outward against the inner surface 24 of the mold 10. As shown in FIG. 1C, the half portions are then separated to permit removal of the blow molded article 26.

Figure 1D:
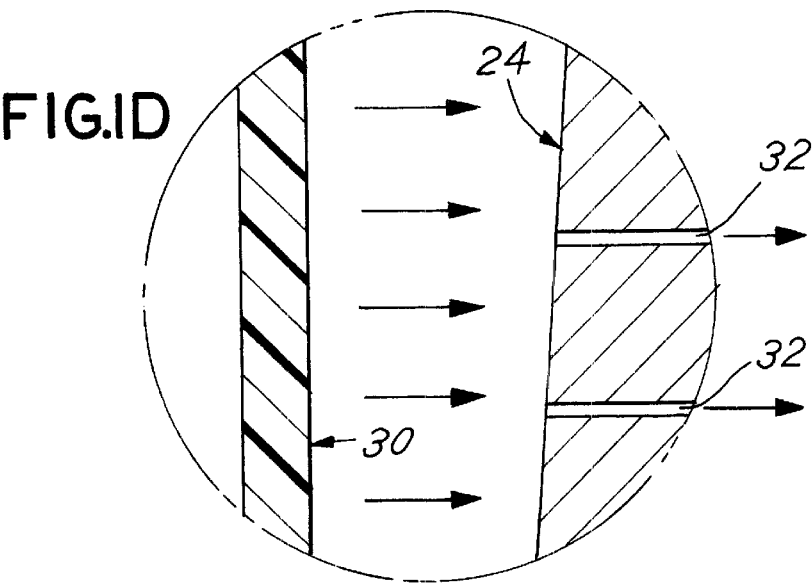

FIG. 1D is a magnified view of a portion of FIG. 1B showing the interaction between the outer surface 30 of the expanding parison 12 and the inner surface 24 of the mold 10. Mold surface 24 is provided with a series of vent holes 32 (two shown) spaced at regular intervals to permit the escape of trapped gas from the mold as the parison 12 expands outward in the direction of the arrows in FIG. 1D.

Figure 2:
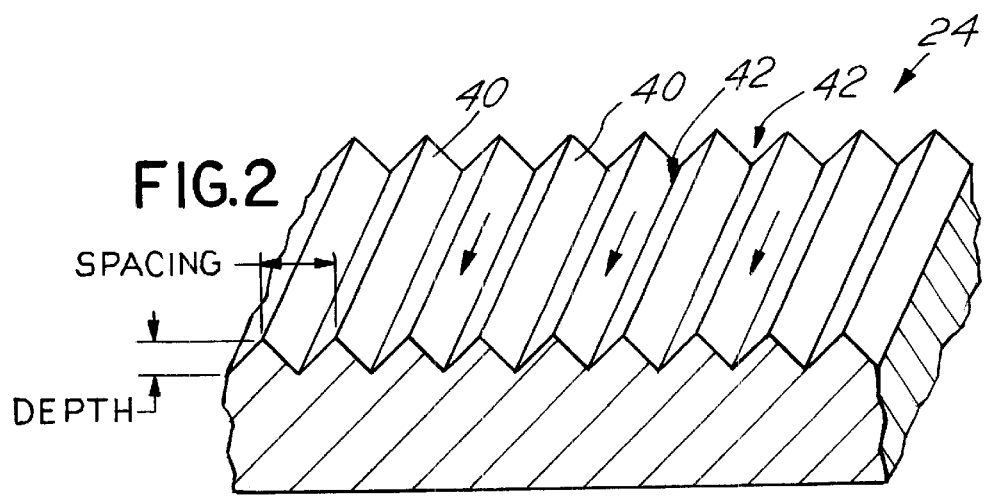
FIG. 2 is an isometric of a blow mold surface according to another preferred embodiment of the present invention.

The blow molding process described above is characteristic of conventional blow molding techniques and may be used in conjunction with the features of the present invention, which relates particularly to the mold surface. Referring now to FIG. 2, which is an isometric of a section of a mold surface according to a preferred embodiment of the invention, the mold surface 24 is provided with a micrograined pattern having a series of raised projections 40 which define a network of channels 42 therebetween. In FIG. 2, the channels 42 are shown parallel to one another. It will be understood that the channels 42 may be interconnected by cross-channels (not shown) which extend in a generally orthogonal direction to the extent of the channels illustrated. The channels 42 communicate with vent holes (not shown in FIG. 2) to permit air to vent out of the mold.

In accordance with the present invention, the spacing of the peaks of raised projections 40 and the depth of channels 42 are selected to maximize venting capabilities while preventing the formation of visibly detectable patterns on the surface of the molded article. A depth range of between 10 and 40 microns is preferred.

Figure 3A:
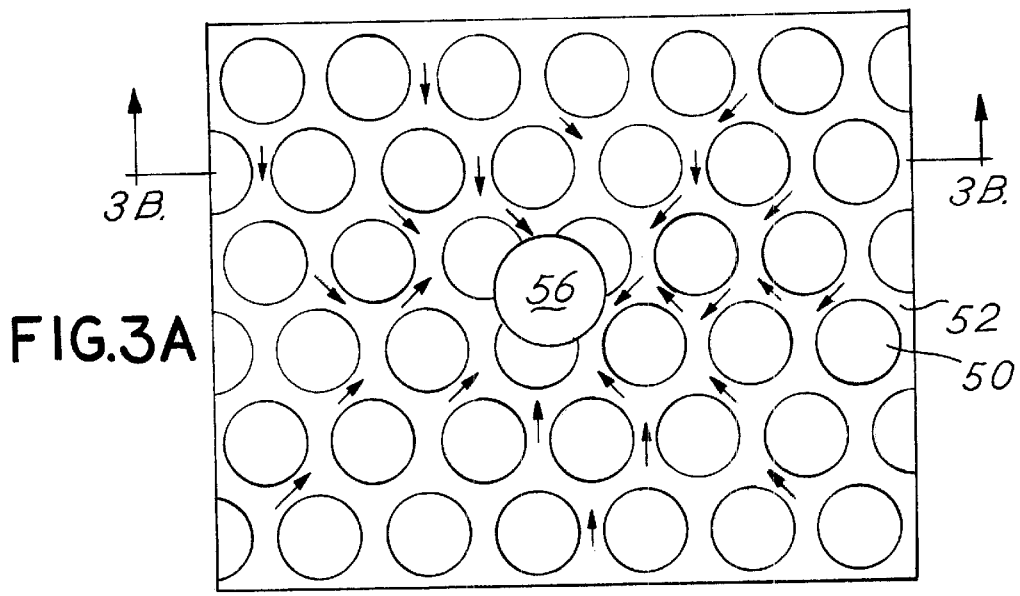
FIG. 3A is a top view of a blow mold surface according to another preferred embodiment of the present invention.
Figure 3B:
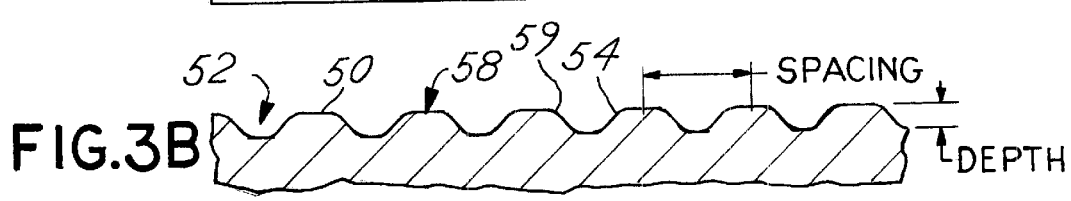
FIG. 3B is a cross-section of the surface taken along line 3B—3B of FIG. 3A.

FIG. 3A is a top magnified view of a mold surface pattern according to another preferred embodiment of the present invention. The micrograined pattern is in the form of a series of circular projections 50 arranged in rows, with the centers of circular projections of adjacent rows being offset. The circular projections 50 define a network of interconnected channels 52 which communicate with vent holes 56 (one shown). The channels 52 are of an irregular shape and varying width, as defined by the circular periphery of the projections 50. Referring to the cross-section shown in FIG. 3B, the circular projections 50 have a flat upper surface 58 and rounded edges 59. The bottom of channels 52 is of a generally rounded shape, defining an undulating mold surface 54. The circular periphery of the projections 50 form the channels 52 of varying width and non-linear pathway from points on the mold to the vent holes 56. The offset centers of the circular projections 50 reduce the likelihood that noticeable micrograined patterns will appear in the finished molded article.

Figure 4A:
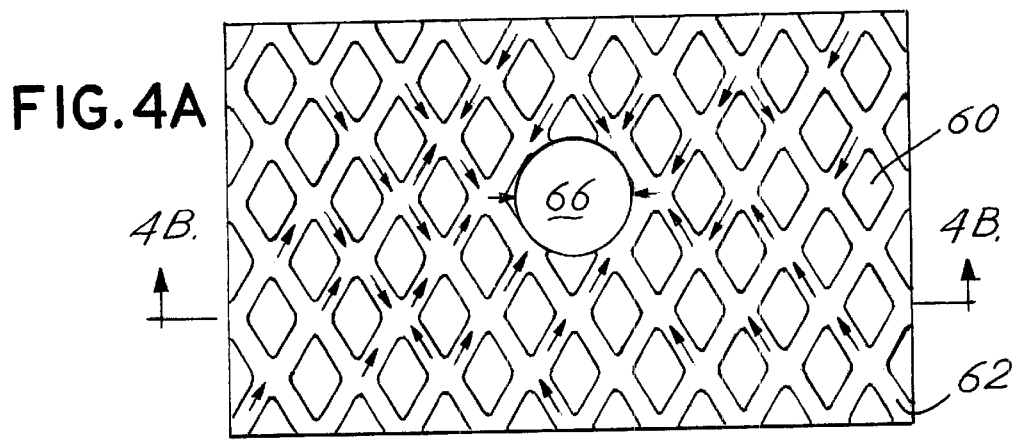
FIG. 4A is a top view of a blow mold surface according to another preferred embodiment of the present invention.
Figure 4B:
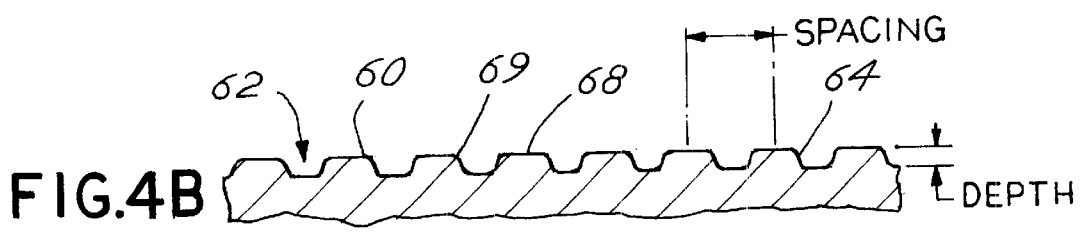
FIG. 4B is a cross-section of the surface taken along line 4B—4B of FIG. 4A.

FIG. 4A is a top magnified view of a mold surface pattern according to another preferred embodiment of the present invention. Here, projections 60 are shaped generally as a parallelogram and define a network of channels 62 which communicate with vent holes 66 (one shown). Referring to the cross-section shown in FIG. 4B, the projections 60 have a flat upper surface 68 and rounded edges 69. The bottoms of channels 62 are of a generally rounded shape. The generally flat peripheral surfaces of the projections 60 form interconnected linear channels 62 which provide for efficient evacuation of escaping air from the mold.

Those of ordinary skill will recognize that the aforementioned surface patterns with defined channels provide for the formation of venting passages with the surface of the expanded parison during molding. The surface patterns may be formed by conventional mold surface preparation techniques, such as by etching or laser machining. It will also be appreciated by those of ordinary skill, that dimensions of the mold surface pattern are selected to provide for the formation of venting passages with the surface of the expanded parison. Thus, the dimensions will depend on a number of factors, including the fluid and shrinkage characteristics of the molded material and the pressure applied to the parison during molding. For example, the depth of the projections for a molding process at a given pressure is preferably less than the depth of the projections for a molding process at a higher pressure because higher molding pressures will tend to force the material deeper into the channels and eliminate the venting passages that would otherwise be formed.

What is claimed is:

1. An apparatus for blow-molding vehicular body components having a smooth surface finish, the apparatus comprising a mold having a mold surface provided with a controlled micrograined pattern that facilitates the controlled formation of venting passages with the surface of a parison, wherein the controlled micrograined pattern includes projections that define a network of interconnected channels, the channels being of sufficient depth to facilitate the formation of the venting passages with the parison and wherein the projections are one of: a substantially circular shape and a substantially parallelogram shape.

2. The apparatus of claim 1, wherein the micrograined pattern includes a series of substantially circular projections arranged in rows to define a network of interconnected channels.

3. The apparatus of claim 2, wherein the centers of the substantially circular projections of adjacent rows are offset.

4. The apparatus of claim 2, wherein the channels are in fluid communication with vent holes formed in the mold.

5. The apparatus of claim 2, wherein the circular projections have a substantially flat upper surface and rounded edges.

6. An apparatus for blow-molding vehicular body components having a smooth surface finish, the apparatus comprising a mold having a mold surface provided with a controlled micrograined pattern that facilitates the controlled formation of venting passages with the surface of a parison, wherein the micrograined pattern includes a series of substantially circular projections arranged in rows to define a network of interconnected channels and the depth of the channels is from 10 to 40 microns.

7. The apparatus of claim 1, wherein the micrograined pattern includes a series of substantially parallelogram-shaped projections arranged in rows to define a network of interconnected channels.

8. An apparatus for blow-molding vehicular body components having a smooth surface finish, the apparatus comprising a mold having a mold surface provided with a controlled micrograined pattern that facilitates the controlled formation of venting passages with the surface of a parison, wherein the micrograined pattern includes a series of substantially parallelogram-shaped projections arranged in rows to define a network of interconnected channels, and the centers of the substantially parallelogram-shaped projections of adjacent rows are offset.

9. The apparatus of claim 7, wherein the channels are in fluid communication with vent holes formed in the mold.

10. The apparatus of claim 7, wherein the circular projections have a substantially flat upper surface and rounded edges.

11. An apparatus for blow-molding vehicular body components having a smooth surface finish, the apparatus comprising a mold having a mold surface provided with a controlled micrograined pattern that facilitates the controlled formation of venting passages with the surface of a parison, wherein the controlled micrograined pattern includes a series of substantially parallelogram-shaped projections arranged in rows to define a network of interconnected channels and the depth of the channels is from 10 to 40 microns.

12. A method of blow molding vehicular body components, the method comprising the steps of:

a) providing a mold having a mold surface including a controlled micrograined pattern;

b) providing a parison of material to be expanded outward against the mold surface; and c) expanding the parison outward against the mold surface such that an outer surface of the parison forms controlled venting passages with the controlled micrograined pattern, wherein the step of providing a mold surface further comprises the step of providing projections defining a network of interconnected channels and wherein the projections are one of: substantially circular in shape and substantially parallelogram in shape.

\* \* \* \* \*